US008479305B1

(12) United States Patent
Benson et al.

(10) Patent No.: US 8,479,305 B1
(45) Date of Patent: Jul. 2, 2013

(54) METHOD AND SYSTEM FOR MANAGING A DATA OBJECT SO AS TO COMPLY WITH PREDETERMINED CONDITIONS FOR USAGE

(75) Inventors: Greg Benson, San Diego, CA (US); Gregory H. Urich, Lund (SE); Christopher L. Knauft, San Diego, CA (US)

(73) Assignee: Rovi Solutions Corporation, Santa Clara, CA (US)

(*) Notice: Subject to any disclaimer, the term of this patent is extended or adjusted under 35 U.S.C. 154(b) by 1386 days.

(21) Appl. No.: 09/164,606

(22) Filed: Oct. 1, 1998

Related U.S. Application Data

(63) Continuation of application No. 08/594,811, filed on Jan. 31, 1996, now Pat. No. 5,845,281.

(30) Foreign Application Priority Data

Feb. 1, 1995 (SE) ...................................... 9500355

(51) Int. Cl.
*G06F 17/30* (2006.01)
(52) U.S. Cl.
USPC ................................ 726/31; 705/51; 707/781
(58) Field of Classification Search
USPC ................ 395/609, 610, 614; 707/9, 10, 103, 707/781–788; 705/54, 59, 50–52; 713/150, 713/160, 161; 726/26–33
See application file for complete search history.

(56) References Cited

U.S. PATENT DOCUMENTS

| 4,173,408 A | 11/1979 | Stewart |
| 4,634,807 A | 1/1987 | Chorley et al. |
| 4,757,534 A | 7/1988 | Matyas et al. |
| 4,768,087 A | 8/1988 | Taub et al. |
| 4,817,140 A | 3/1989 | Chandra et al. |
| 4,827,508 A | 5/1989 | Shear |
| 4,866,769 A | 9/1989 | Karp |
| 4,919,545 A * | 4/1990 | Yu |
| 4,967,403 A | 10/1990 | Ogawa et al. |

(Continued)

FOREIGN PATENT DOCUMENTS

| EP | 0 367 700 | 5/1990 |
| EP | 0367700 | * 5/1990 |

(Continued)

OTHER PUBLICATIONS

Cornish, G., Copyright Management of Documnet Supply in an Electronic Age, *Interlending & Document Supply* 21(2):13-20 (1993).

(Continued)

*Primary Examiner* — M. N. Von Buhr
(74) *Attorney, Agent, or Firm* — Kauth, Pomeroy, Peck & Bailey LLP

(57) ABSTRACT

A method and a system for managing a data object so as to comply with predetermined conditions for usage of the data object. To control the usage of the data object, a set of control data, defining usages of the data object which comply with the predetermined conditions, is created for the data object. The data object is concatenated with the user set of control data, encrypted and transferred to the user. When the user wants to use the data object, a special user program checks whether the usage complies with the control data. If so, the usage is enabled. Otherwise it is disabled.

1 Claim, 15 Drawing Sheets

U.S. PATENT DOCUMENTS

| | | | |
|---|---|---|---|
| 5,001,752 A | 3/1991 | Fischer | |
| 5,014,234 A | 5/1991 | Edwards, Jr. | |
| 5,023,907 A * | 6/1991 | Johnson et al. | |
| 5,048,085 A | 9/1991 | Abraham et al. | |
| 5,050,212 A | 9/1991 | Dyson | |
| 5,103,392 A | 4/1992 | Mori | |
| 5,103,476 A * | 4/1992 | Waite et al. | |
| 5,214,700 A | 5/1993 | Pinkas et al. | |
| 5,222,134 A * | 6/1993 | Waite et al. | 380/4 |
| 5,235,642 A * | 8/1993 | Wobber et al. | 380/25 |
| 5,315,448 A | 5/1994 | Ryan | |
| 5,319,705 A * | 6/1994 | Halter et al. | 380/4 |
| 5,321,841 A * | 6/1994 | Fast et al. | 395/725 |
| 5,354,097 A | 10/1994 | Tel | |
| 5,375,240 A * | 12/1994 | Grundy | 395/700 |
| 5,400,403 A * | 3/1995 | Fahn et al. | 380/21 |
| 5,408,501 A | 4/1995 | Cornaby | |
| 5,432,950 A | 7/1995 | Sibigtroth | |
| 5,504,818 A | 4/1996 | Okano | |
| 5,509,070 A | 4/1996 | Schull | |
| 5,532,920 A | 7/1996 | Hartrick et al. | |
| 5,563,946 A | 10/1996 | Cooper et al. | |
| 5,606,609 A | 2/1997 | Houser et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,644,727 A | 7/1997 | Atkins | |
| 5,646,997 A | 7/1997 | Barton | |
| 5,715,403 A | 2/1998 | Stefik | |
| 5,845,281 A | 12/1998 | Benson et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,943,422 A | 8/1999 | Van Wie et al. | |
| 5,949,876 A | 9/1999 | Ginter et al. | |
| 5,982,891 A | 11/1999 | Ginter et al. | |
| 6,157,721 A | 12/2000 | Shear et al. | |
| 6,266,654 B1 | 7/2001 | Schull | |
| 7,076,652 B2 | 7/2006 | Ginter et al. | |
| 7,120,802 B2 | 10/2006 | Shear et al. | |
| 7,124,302 B2 | 10/2006 | Ginter et al. | |
| 2004/0039741 A1 | 2/2004 | Benson et al. | |

FOREIGN PATENT DOCUMENTS

| | | | |
|---|---|---|---|
| EP | 0567800 | * | 4/1993 |
| EP | 0 567 800 | | 11/1993 |
| EP | 0 567 800 A1 | | 11/1993 |
| EP | 0 578 570 A1 | | 1/1994 |
| EP | 0587570 A1 | | 1/1994 |
| EP | 0 601 500 | | 6/1994 |
| EP | 0653695 | * | 11/1994 |
| EP | 0653695 A2 | | 5/1995 |
| EP | 0 715 246 | | 6/1996 |
| EP | 0715243 A1 | | 6/1996 |
| EP | 0715244 A1 | | 6/1996 |
| EP | 0715245 A1 | | 6/1996 |
| EP | 0715247 A1 | | 6/1996 |
| EP | 1674968 A2 | | 6/2006 |
| JP | 1040100 A | | 2/1998 |
| JP | 10512074 A | | 11/1998 |
| WO | WO-9624092 A2 | | 8/1996 |
| WO | WO-9624092 A3 | | 8/1996 |
| WO | WO96/27155 | * | 9/1996 |
| WO | WO-9627155 A2 | | 9/1996 |
| WO | WO-9909698 A1 | | 2/1999 |
| WO | WO-0150319 A2 | | 7/2001 |

OTHER PUBLICATIONS

Marchisio, et al., Multimedia and hypermedia applications, *CSELT Technical Reports* XXI(2):463-484 (1993).

Garrett, et al., Toward an electronic Copyright Management System, *J. Amer. Soc. for Info. Sci.* 44(8):468-473 (1993).

Miller, et al., News On-Demand for Multimedia Networks, *Proc. ACM Multimedia* (1993).

Mintz, A., Availability of Electronic Full-Text Sources: A Look Behind the Scenes, *Database* pp. 24-31. Oct. (1993).

Reinhardt, A., Building the Data Highway, *Byte*, pp. 46-74 Mar. 1994.

Stefik, M., Letting Loose the Light: Igniting Commerce in Electronic Publication, *Internet Dreams—Archetypes, Myths, and Metaphors, The MIT Press, Cambridge, Mass.*, London, England, pp. 219-253 (1996).

Perritt H.H.: "Knowbots, Permissions Headers and Contract Law", Proceedings Technological Strategies for Protecting Intellectual Property in the Networked Multimedia Environment, Apr. 2, 1993, pp. 39-50, XP002233403.

Van Slype, Georges, Copyright in Transmitted Electronic Documents (CITED), "Natural language version of the generic CITED model," vol. I, Sep. 6, 1993.

Van Slype, Georges, Copyright in Transmitted Electronic Documents (CITED), "Natural language version of the generic CITED model," vol. II, Sep. 6, 1993.

"International Application Serial No. PCT/US2000/035103, International Preliminary Examination Report mailed Apr. 29, 2009", 4 pgs.

"International Application Serial No. PCT/US2000/035103, International Preliminary Examination Report mailed Oct. 24, 2002", 4 pgs.

"International Application Serial No. PCT/US2000/035103, International Search Report mailed Jul. 12, 2001", 2 pgs.

Cornish, G, "Copyright Management of Document Supply in an Electronic Age", Interlending & Document Supply, 21(2), (1993), 13-20.

Garrett, et al., "Toward an Electronic Copyright Management System", J. Amer. Soc. for Info. Sci. 44(8), (1993), 468-473.

Marchisio, et al., "Multimedia and Hypermedia Applications", CSELT Technical Reports XXI(2), (1993), 463-484.

Miller, et al., "News On-Demand for Multimedia Networks", Proc. ACM Multimedia, (1993), 383-392.

Mintz, A, et al., "Availability of Electronic Full-Text Sources: A Look Behind the Scenes", Database, (Oct. 1993), 24-31.

Reinhardt, A, "Building the Data Highway", Byte, Building the Data Highway, Byte, pp. 46-74 Mar. 1994, 46-74.

Sibert, Olin, et al., "DigiBox: A Self-Protecting Container for Information Commerce", Proc. of the First USENIX Workshop on Electronic Commerce, New York, NY, (Jul. 1995), 20-32.

Stefik, M, "Letting Loose the Light: Electronic Publication", In Stefik, ed., Internet Dreams, Archetypes, Myths, and Metaphors, The MIT Press, Cambridge, Mass., London, England, (1996), 219-253.

Hui, Huang, et al., "A Wireless ATM MAC Protocol With Combined Hybrid ARQ and Adaptive Scheduling With Analysis", IEEE VTS 50th Vehicular Technology Conference, 1999. VTC 1999—Fall, (1999), 1720-1724.

Wickers, S B, et al., "Type-II hybrid-ARQ protocols using punctured MDS codes", IEEE Transactions on Communications, 42(234), Part: 3, (Feb. 1994), 1431-1440.

* cited by examiner

Fig 5

| | |
|---|---|
| file identifier | 123456789 |
| title | image |
| format code | a |
| security code | b |

Fig 6

| | | |
|---|---|---|
| usage element for author's phone number | identifer<br>size<br>data | 1<br>13<br>716 381 5356 |
| ...price for single use | identifer<br>size<br>data | 2<br>4<br>.50 |
| ...price for unlimited use | identifer<br>size<br>data | 3<br>4<br>50.00 |
| ...code for usage type approved | identifer<br>size<br>data | 4<br>2<br>9 |
| ...code for number of usages approved | identifer<br>size<br>data | 5<br>2<br>1 |

Fig 8a

| | | |
|---|---|---|
| header | object identifier | 123456789 |
| | format code | 0010 |
| | security code | 0010 |
| | number of usage elements | 2 |
| | size of usage data | 17 |
| | size of data object | 273 |
| | 1st usage element id | 001 |
| | 1st usage element size | 6 |
| | 1st usage element data | 1 |
| | 2nd usage element id | 002 |
| | 2nd usage element size | 3 |
| | 2nd usage element data | |

Fig 8b

| | | |
|---|---|---|
| header | object identifier | 123456790 |
| | format code | 0010 |
| | security code | 0010 |
| | number of usage elements | 2 |
| | size of usage data | 17 |
| | size of data object | 273 |
| | 1st usage element id | 001 |
| | 1st usage element size | 6 |
| | 1st usage element data | 1 |
| | 2nd usage element id | 002 |
| | 2nd usage element size | 3 |
| | 2nd usage element data | 2 |

Fig 11 control data in memory

| 1234567890010001021727300161000232 |

AVI file in memory

```
RIFF0›□□AVILISTÔ□□□hdrlavih8□□□j□□□ŠW□□C\A
D□□□□i□□□□□□□□□□P□□@□□□ð□□□□□□□À
¶□□w□□□□□V6LISTt□□□strlstrh8□□□vidscvid□□□œ
Š□□□{{{hhhhhh{□n—œŠ—œŠhm[hhh□□□‴{{{|sd¢™Š
Çì°¡¦"8=+□□□□□□□□□□□□□{□n□"Ò"§*¯□{□nqvd
□□□½½½——hhh{□n"§¡¦"{□n—œŠ¡¦"qvd{□n,,‰wm[,,
‰w¡¦"—œŠ"§Çì°¡¦"{{{{{"¨ÐÐÐaaaaaaÚÚÚ½
```

Fig 12a concatenated control data and AVI file in memory

```
1234567890010001021727300161000232RIFF0›
□□AVILISTÔ□□□hdrlavih8□□□j□□□ŠW□□C\AD□□
□□i□□□□□□□□□□P□□@□□□ð□□□□□□À¶□□
w□□□□□V6LISTt□□□strlstrh8□□□vidscvid□□□œŠ□□
□{{{hhhhhh{□n—œŠ—œŠhm[hhh□□□‴{{{|sd¢™ŠÇì°¡¦"
8=+□□□□□□□□□□□□□{□n□"Ò"§*¯□{□nqvd□□□
½½½——hhh{□n"§¡¦"{□n—œŠ¡¦"qvd{□n,,‰wm[,,‰w¡¦
"—œŠ"§Çì°¡¦"{{{{{"¨ÐÐÐaaaaaaÚÚÚ½
```

Fig 12b concatenated and encrypted control data and AVI file in memory

```
12345678900100010217273□□□□□□□□□□□□
□□□□□□□□□□□□□□□□□□□□□□□□□□□□□□□□
□□□□□□□□□□□□□□□□□□□□□□□□□□□□□□□□
□□□□□□□□□□□□□□□□□□□□□□□□□□□□□□□□
□□□□□□□□□□□□□□□□□□□□□□□□□□□□□□□□
□□□□□□□□□□□□□□□□□□□□□□□□□□□□□□□□
□□□□□□□□□□□□□□□□□□□□□□□□□□□□□□□□
□□□□□□□□□□□□□□□□□□□□□□□□□½
```

METHOD AND SYSTEM FOR MANAGING A DATA OBJECT SO AS TO COMPLY WITH PREDETERMINED CONDITIONS FOR USAGE

RELATED APPLICATIONS

This application is a continuation of U.S. application Ser. No. 08/594,811, filed on Jan. 31, 1996, now issued as U.S. Pat. No. 5,845,281 which in turn claimed priority to the Swedish Application No. 9500355-4, filed on Feb. 1, 1995.

BACKGROUND OF THE INVENTION

1. Technical Field

The present invention relates to data processing and more particularly to a method and a system for managing data objects so as to comply with predetermined conditions for usage.

2. Description of Related Technology

Much has been written recently regarding the puzzle of universal connectivity. A typical vision of the data highway has long distance high speed data carriers inter connecting regional networks which provide telecommunications services and a wide range of interactive on-line services to consumers. Many of the pieces are already in place, others are in development or testing. In fact, even though the data highway is under construction it is currently open to limited traffic. On-line services are springing up daily and video on demand services are currently being tested.

The potential to benefit society is immense. The scope of information available to consumers will become truly global as the traditional barriers to entry for distribution of, and access to, information are lowered dramatically. This means that more diverse and specialized information will be made available just as conveniently as generic sources from major vendors used to be. The end result is that organizations and individuals will be empowered in ways heretofore only imagined.

However, a fully functioning data highway will only be as valuable as the actual services which it provides. Services envisioned for the data highway that involve the delivery of data objects (e.g. books, films, video, news, music, software, games, etc.) will be and are currently limited by the availability of such objects. Library and educational services are similarly affected. Before owners will allow their data objects to be offered they must be assured of royalty payments and protection from piracy.

Encryption is a key component of any solution to provide copy protection. But encryption alone is not enough. During transmission and storage the data objects will be protected by encryption, but as soon as anyone is given the key to decipher the content he will have unlimited control over it. Since the digital domain permits data objects to be reproduced in unlimited quantities with no loss of quality, each object will need to be protected from unlimited use and unauthorized reproduction and resale.

The protection problem must not be solved by a separate solution for each particular data format, because then the progress will indeed be slow. It is important to consider the effect of standardization on an industry. Consider how the VHS, the CD and the DAT formats, and the IBM PC compatibility standards have encouraged growth in their respective industries. However, if there is to be any type of standardization, the standard must provide universal adaptability to the needs of both data providers and data users.

The data object owner may want to have permanent secure control over how, when, where, and by whom his property is used. Furthermore, he may want to define different rules of engagement for different types of users and different types of security depending on the value of particular objects. The rules defined by him shall govern the automated operations enabled by data services and networking. The owner may also want to sell composite objects with different rules governing each constituent object. Thus, it is necessary to be able to implement variable and extensible control.

The user on his part wants to be able to search for and purchase data objects in a convenient manner. If desired, the user should be able to combine or edit purchased objects (i.e. for creating a presentation). Furthermore, the user may want to protect his children from inappropriate material. A complete solution must enable these needs as well.

What is needed is a universally adaptable system and method for managing the exchange and usage of data objects while protecting the interests of data object owners and users.

A method for enforcing payment of royalties when copying softcopy books is described in the European patent application EP 0 567 800. This method protects a formatted text stream of a structured document which includes a royalty payment element having a special tag. When the formatted text stream is inputted in the user's data processor, the text stream is searched to identify the royalty payment element and a flag is stored in the memory of the data processor. When the user for instance requests to print the document, the data processor requests authorization for this operation from a second data processor. The second data processor charges the user the amount indicated in the royalty payment element and then transmits the authorization to the first data processor.

One serious limitation of this method is that it can only be applied to structured documents. The description of the above-mentioned European patent application defines a structured document as: a document prepared in accordance with an SGML-compliant type definition. In other words it can not be applied to documents which are not SGML compliant and it cannot be applied to any other types of data objects.

Furthermore, this method does not provide for variable and extensible control. Anyone can purchase a softcopy book on a CD, a floppy disc or the like, and the same royalty amount is indicated in the royalty payment element of all softcopy books of the same title.

Thus, the method described in EP 0 567 800 does not satisfy the above-mentioned requirements for universally adaptable protection of data objects.

SUMMARY OF THE INVENTION

Certain aspects of the present invention includes a method and a data processing system for managing a data object in a manner that is independent of the format and the structure thereof, so as to comply with predetermined conditions for usage control and royalty payment.

More particularly, a data object provider, e.g., the owner of a data object or his agent (broker), stores the data object in a memory device, e.g. a bulk storage device, where it is accessible by means of the data provider's data processor. The data object can consist of digital data, analog data or a combination or hybrid of analog and digital data.

A general set of control data, which is based on the predetermined conditions for usage of the data object, is created and stored in the same memory device as the data object or another memory device where it is accessible by the data provider's data processor. The predetermined conditions for usage may be defined by the data object owner, by the broker or by anyone else. They may differ, between different data objects.

The general set of control data comprises at least one or more usage control elements, which define usages of the data object which comply with the predetermined conditions. These usages may encompass for instance the kind of user, a time limit for usage, a geographical area for usage, allowed operations, such as making a hard copy of the data object or viewing it, and/or claim to royalty payment. The general set of control data may comprise other kinds of control elements besides the usage control element. In a preferred embodiment, the general set of control data comprises a security control element which defines a security procedure which has to be carried out before usage of the data object. It also comprises an identifier, which uniquely identifies the general set of control data.

The general set of control data is concatenated with a copy of the data object. Thus, the control data does not reside in the data object, but outside it, which makes the control data independent of the format of and the kind of data object and which allows for usage control independently of the data object format.

At least the usage control element(s) and the data object are encrypted, so that the user is unable to use the data object without a user program which performs the usage control and which decrypts the data object. Alternatively, the whole set of control data and the copy of the data object may be encrypted.

A user may request authorization for usage of a data object residing at a data provider's processor via a data network or in any other appropriate way. The authorization may or may not require payment. When a request for authorization for usage is received, a user set of control data is created by the data provider's processor. The user set of control data comprises the general set of control data or a subset thereof including at least one of said usage control elements which is relevant for the actual user. It typically also includes a new identifier which uniquely identifies this set of control data. If relevant, the user set of control data also comprises an indication of the number of usages authorized. If more than one kind of usage is authorized, the number of each kind of usage may be specified. Finally, the user set of control data is concatenated with a copy of the data object, and at least the usage control elements and the copy of the data object are encrypted to create a secure data package ready for transfer to the user.

Before the data package is transferred to the user, it should be confirmed that the request for authorization for usage has been granted. The check is preferably carried out before the user set of control data is created. However, it can also be carried out in parallel with or after the creation of the user control data. In the latter case, the number of usages requested by the user is tentatively authorized and included in the user set, but if the request is refused the user set is canceled or changed.

The data package may be transferred to the user by electronic means or stored on bulk storage media and transferred to the user by mail or by any suitable transportation means.

Once the data object has been packaged in the above-described manner, it can only be accessed by a user program which has built-in usage control and means for decrypting the data package. The user program will only permit usages defined as acceptable in the control data. Moreover, if the control data comprises a security control element, the security procedure prescribed therein has to be complied with. In one embodiment, the usage control may be performed as follows. If the user decides to use a data object, the user program checks the control data to see if this action is authorized. More particularly, it checks that the number of authorized usages of this kind is one or more. If so, the action is enabled and the number of authorized usages decremented by one. Otherwise, the action is interrupted by the user program and the user may or may not be given the opportunity to purchase the right to complete the action.

After the usage, the user program repackages the data object in the same manner as it was packaged before.

When a data object is redistributed by a user or a broker, new control elements are added in the control data to reflect the relation between the old user/broker and the new user/broker. In this way, an audit trail for the data object may be created.

According to another aspect of the invention at least two data packages are stored on a user's data processor, which examines the usage control elements of the data packages in order to find a match. If a match is found, the user's data processor carries out an action which is specified in the user set of control data. This method can be used for selling and buying data objects.

BRIEF DESCRIPTION OF DRAWINGS

FIG. 5 is an example of a header file.

FIG. 6 is an example of a usage data file.

FIGS. 8a and 8b are examples of control data for a data object on the data object provider's data processor and for an object ready to be transferred to a user, respectively.

FIG. 11 is a memory image of a data object and its control data.

FIG. 12a is a memory image of the concatenated control data and data object.

FIG. 12b is a memory image of the concatenated and encrypted control data and data object.

DESCRIPTION OF CERTAIN EMBODIMENTS OF THE INVENTION

Certain embodiments of the invention are described in this section.

General Overview

Figure 1:
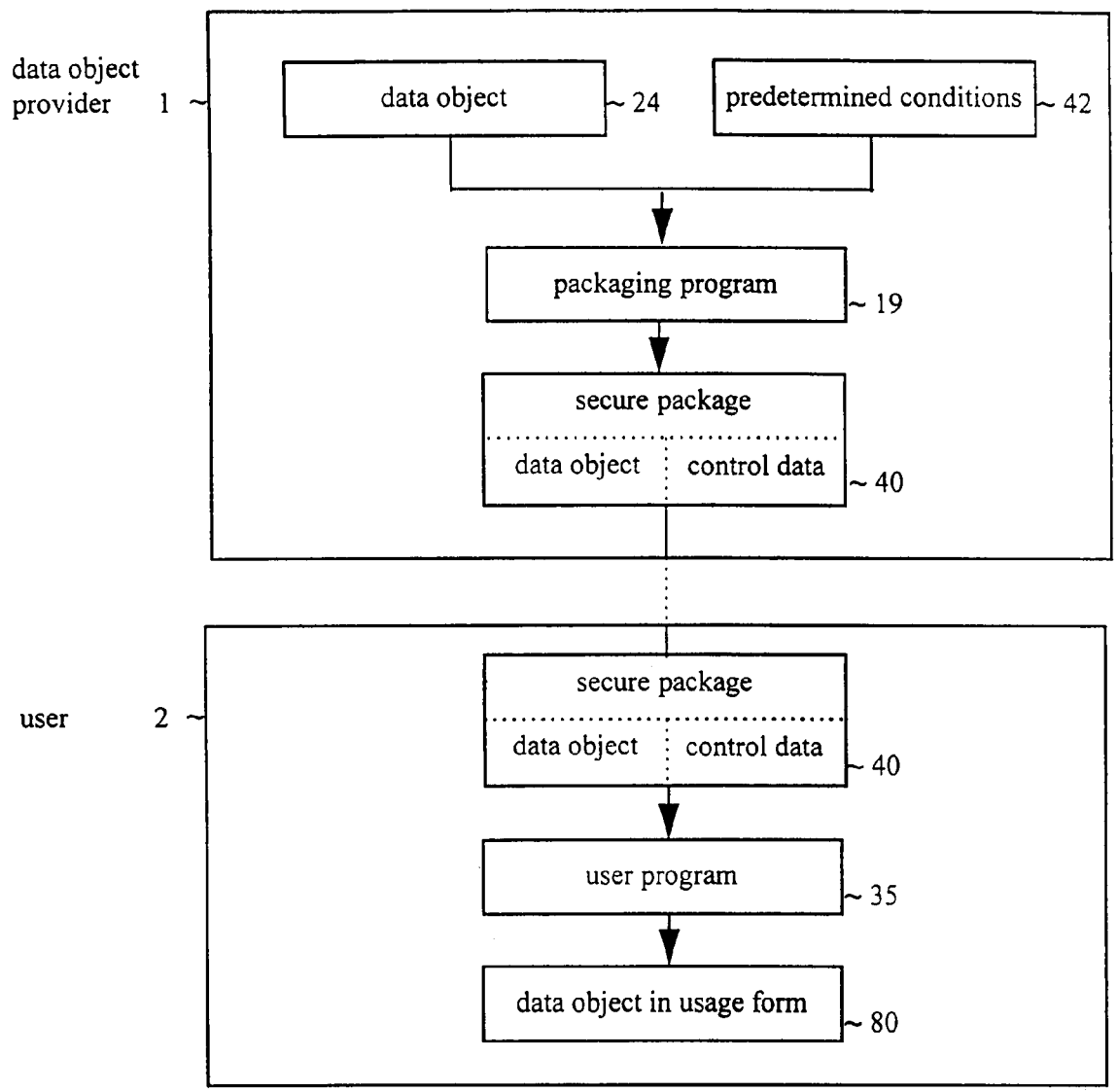
FIG. 1 is a flow diagram showing the general data flow according to the invention.

FIG. 1 is a flow diagram showing the general data flow according to the invention. The flow diagram is divided into a data object provider part 1 and a user part 2.

In the data object provider part 1, a data object 24 is created by an author. The data object 24 may be stored in a data base management system (DBMS) 22. The data object can consist of digital data, analog data or a combination or hybrid of analog and digital data. The primary difference between analog data objects and digital data objects is the means for storage, transfer and usage.

The author also determines the conditions 42 for the usage of the data object 24 by a user. The data object 24 and the usage conditions 42 are input to a data packaging program 19, which creates a secure data package 40 of the data object and of control data which are based on the input usage conditions 42. Once packaged in this way, the data object can only be accessed by a user program 35.

The data object may be packaged together with a general set of control data, which is the same for all users of the data object. This may be the case when the data object is sent to a retailer or a bulletin board, wherefrom a user may obtain it. The data object may also be packaged as a consequence of a request from a user for usage of the data object. In that case, the package may include control data which is specifically adapted to that user. This control data is called a user set of control data. It may for example comprise the number of usages purchased by the user. Typically, the user set of control data will be created on the basis of the general set of control data and include at least a subset thereof. A user set of control data need not always be adapted for a specific user. All sets of control data which are created on the basis of a general. set of control data will be called a user set of control data. Thus, a set of control data can be a general set in one phase and a user set in another phase.

The above-mentioned data packaging can be carried out by the author himself by means of the data packaging program 19. As an alternative, the author may send his data object to a broker, who inputs the data object and the usage conditions determined by the author to the data packaging program 19 in order to create a secure package 3. The author may also sell his data object to the broker. In that case, the broker probably wants to apply his own usage conditions to the data packaging program. The author may also provide the data object in a secure package to the broker, who repackages the data object and adds further control data which is relevant to his business activities. Various combinations of the above alternatives are also conceivable.

In the user part 2 of the flow diagram, the secure package 40 is received by a user, who must use the user program 35 in order to unpackage the secure package 40 and obtain the data object in a final form 80 for usage. After usage, the data object is repackaged into the secure package 40.

The different parts of the system and the different steps of the method according to the invention will now be described in more detail.

The Data Provider's Data Processor

Figure 2:
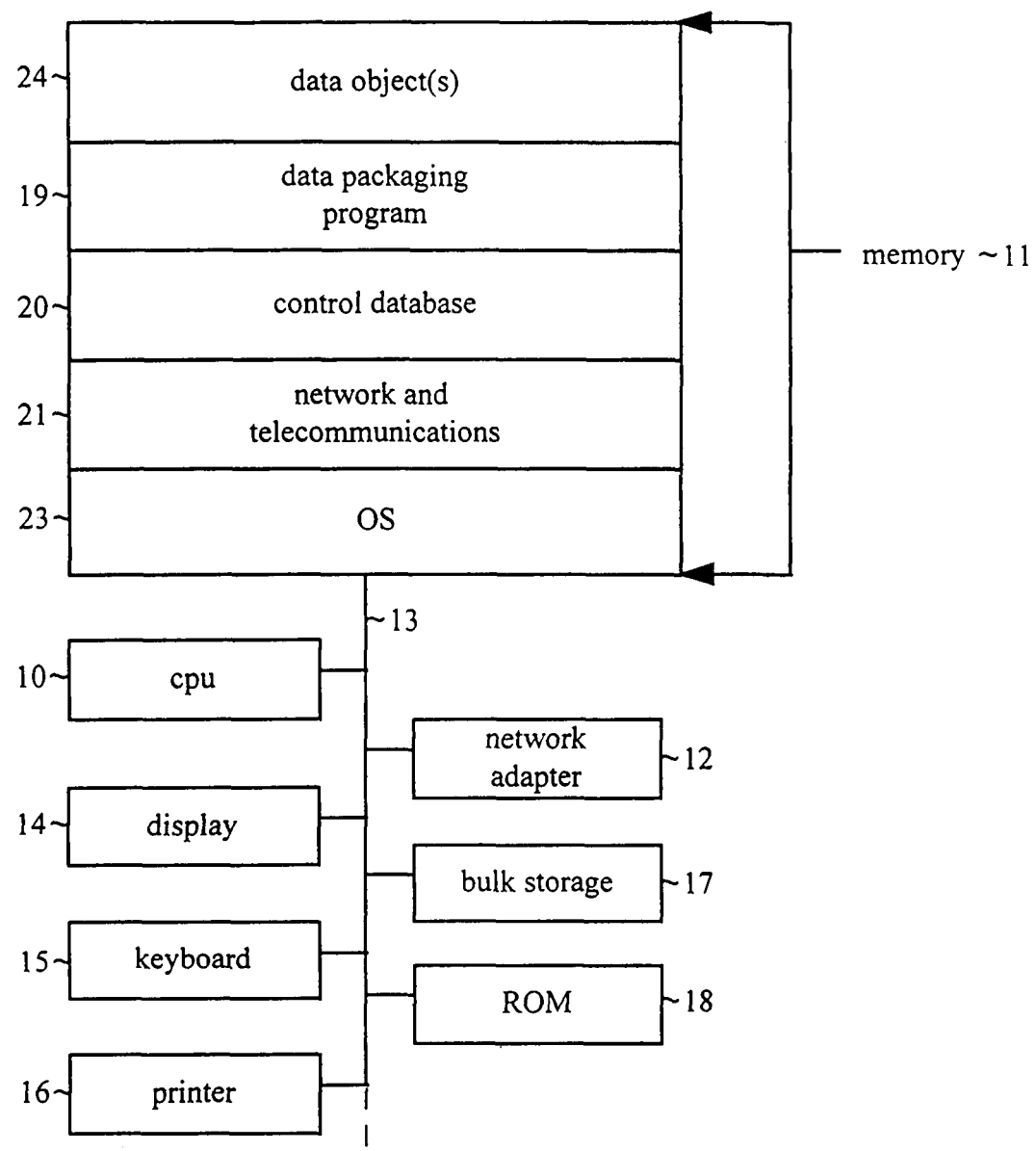
FIG. 2 is a system block diagram of a data object provider's data processor.

FIG. 2 is a system block diagram of a data object provider's data processor. As mentioned above, the data object provider may be an author of a data object, an owner of a data object, a broker of a data object or anyone else who wants to distribute a data object, while retaining the control of its usage. The data processor is a general or special purpose processor, preferably with network capabilities. It comprises a CPU 10, a memory 11 and a network adapter 12, which are interconnected by a bus 13. As shown in FIG. 2, other conventional means, such as a display 14, a keyboard 15, a printer 16, a bulk storage device 17, and a ROM 18, may also be connected to the bus 13. The memory 11 stores network and telecommunications programs 21 and an operating system (OS) 23. All the above-mentioned elements are well-known to the skilled person and commercially available. For the purpose of the present invention, the memory 11 also stores a data packaging program 19 and, preferably, a database 20 intended for control data. Depending upon the current operation, one or more data objects 24 can be stored in the memory 11 as shown or in the bulk storage 17. The data provider's data processor is considered secure.

The Data Packaging Program

The data packaging program 19 is used for creating control data for controlling the usage of a data object and for packaging the data object and the control data into a secure package.

Figure 3:
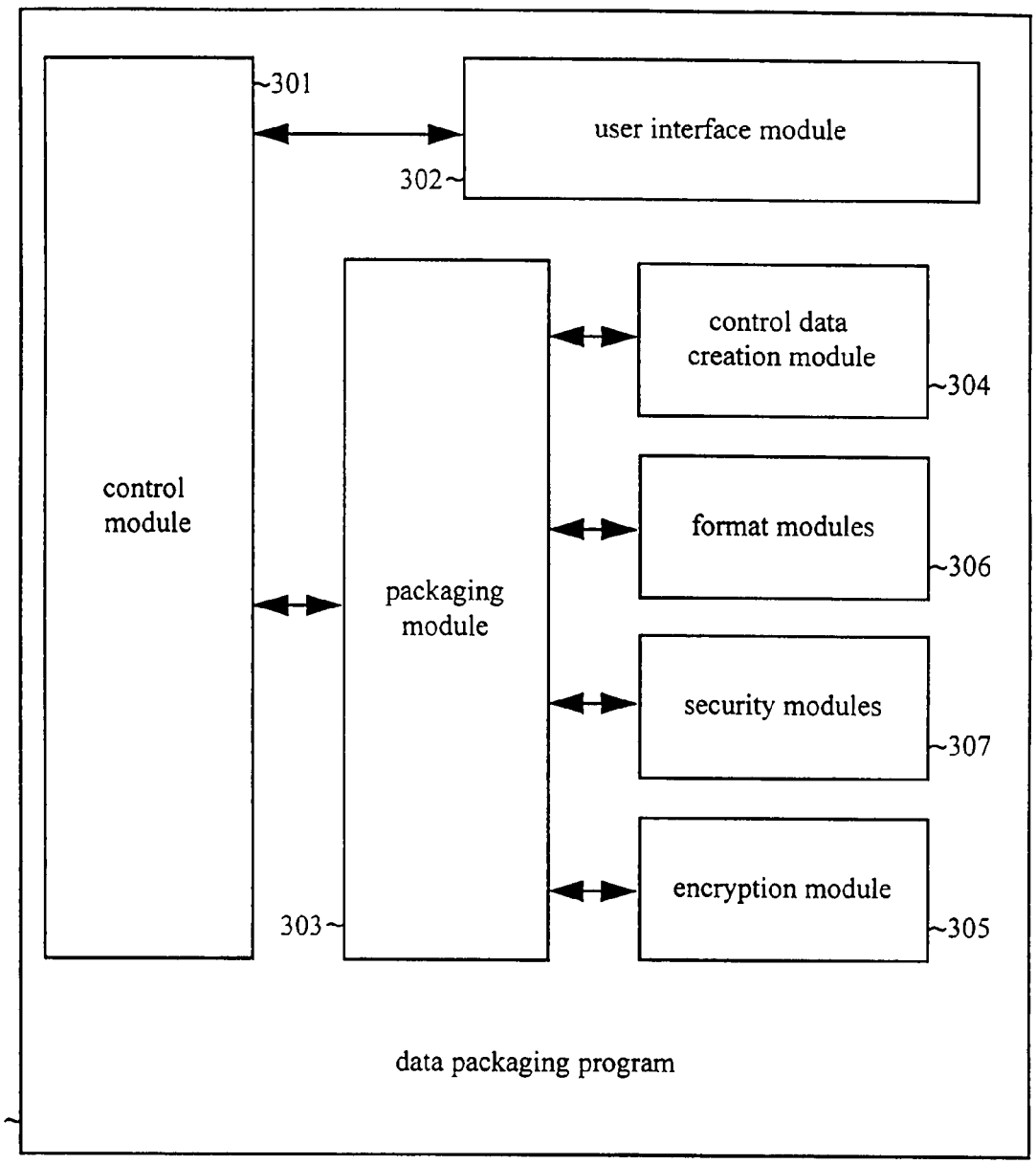
FIG. 3 is a block diagram showing the different modules of a data packaging program according to the invention.

As shown in FIG. 3, it comprises a program control module 301, a user interface module 302, a packaging module 303, a control data creation module 304, an encryption module 305, one or more format modules 306, and one or more security modules 307.

The control module 301 controls the execution of the other modules. The user interface module 302 handles interaction with the data object provider. The packaging module 303 packages the control data and the data object. It uses the control data creation module 304, the format modules 306, the security modules 307 and the encryption module 305 as will be described more in detail below.

The format modules 306 comprise program code, which is required to handle the data objects in their native format. They can fulfill functions such as data compression and data conversion. They can be implemented by any appropriate, commercially available program, such as by means of a routine from the PKWARE Inc. Data Compression Library for Windows and the Image Alchemy package from Handmade Software Incorporated, respectively. They can also be implemented by custom designed programs.

The security modules 307 comprise program code required to implement security, such as more sophisticated encryption than what is provided by the encryption module 305, authorization algorithms, access control and usage control, above and beyond the basic security inherent in the data package.

The data packaging program 19 can contain many different types of both format and security modules. The program control module 301. applies the format and security modules which are requested by the data provider.

The encryption module 305 may be any appropriate, commercially available module, such as "FileCrypt" Visual Basic subprogram found in Crescent Software's QuickPak Professional for Windows—FILECRPT.BAS, or a custom designed encryption program.

The control data creation module 304 creates the control data for controlling the usage of the data object. An example of a control data structure will be described more in detail below.

The Control Data

The control data can be stored in a header file and a usage data file. In a preferred embodiment, the header file comprises fields to store an object identifier, which uniquely identifies the control data and/or its associated data object, a title, a format code, and a security code. The format code may represent the format or position of fields in the usage data file. Alternatively, the format code may designate one or more format modules to be used by the data packaging program or the user program. The security code may represent the encryption method used by the encryption module 305 or any security module to be used by the data packaging program and the user program. The header file fields will be referred to as header elements.

The usage data file comprises at least one field for storing data which controls usage of the data object. One or more usage data fields which represent one condition for the usage of the data object will be referred to as a usage element. In a preferred embodiment, each usage element is defined by an identifier field, e.g. a serial number, a size field, which specifies the size of the usage element in bytes or in any other appropriate way, and a data field.

The header elements and the usage elements are control elements which control all operations relating to the usage of the object. The number of control elements is unlimited. The data provider may define any number of control elements to represent his predetermined conditions of usage of the data object. The only restriction is that the data packaging program 19 and the user program 35 must have compatible program code to handle all the control elements. This program code resides in the packaging module and the usage manager module, to be described below.

Control elements can contain data, script or program code which is executed by the user program 35 to control usage of the related data object. Script and program code can contain conditional statements and the like which are processed with the relevant object and system parameters on the user's data processor. It would also be possible to use a control element to specify a specific proprietary user program which can only be obtained from a particular broker.

It is evident that the control data structure described above is but one example. The control data structure may be defined in many different ways with different control elements. For example, the partitioning of the control data in header data and usage data is not mandatory. Furthermore, the control elements mentioned above are but examples. The control data format may be unique, e.g. different for different data providers, or defined according to a standard.

The Operation of the Data Packaging Program

The operation of a first embodiment of the data packaging program will now be described with reference to the block diagram of FIG. 3 and the flow diagram of FIG. 4.

First a data provider creates a data object and saves it to a file, step 401. When the data packaging program is started, step 402, the user interface module 302 prompts the data object provider to input, step 403, the header information consisting of e.g. an object identifier, a title of the data object, a format code specifying any format module to be used for converting the format of the data object, and a security code specifying any security module to be used for adding further security to the data object. Furthermore, the user interface module 302 prompts the data object provider to input usage information, e.g. his conditions for the usage of the data object. The usage information may comprise the kind of user who is authorized to use the data object, the price for different usages of the object etc. The header information and the usage information, which may be entered in the form of predetermined codes, is then passed to the control module 301, which calls the packaging module 303 and passes the information to it.

The packaging module 303 calls the control data creation module 304, which first creates a header file, then creates header data on the basis of the header information entered by the data object provider and finally stores the header data, step 404-405. Then a usage data file is created, usage data created on the basis of the usage information entered by the data provider, and finally the usage data is stored in the usage data file, step 406-407.

The packaging module 303 then applies any format and security modules 306, 307 specified in the header file, steps 408-413, to the data object.

Next, the packaging module 303 concatenates the usage data file and the data object and stores the result as a temporary file, step 414. The packaging module 303 calls the encryption module 305, which encrypts the temporary file, step 415. The level of security will depend somewhat on the quality of the encryption and key methods used.

Finally, the packaging module 303 concatenates the header file and the encrypted temporary file and saves the result as a single file, step 416. This final file is the data package which may now be distributed by file transfer over a network, or on storage media such as CDROM or diskette, or by some other means.

EXAMPLE 1

An example of how the data packaging program 19 can be used will now be described with reference to FIGS. 5 and 6. In this example the data object provider is a computer graphics artist, who wants to distribute an image that can be used as clip art, but only in a document or file which is packaged according to the method of the invention and which has usage conditions which do not permit further cutting or pasting. The artist wants to provide a free preview of the image, but also wants to be paid on a per use basis unless the user is willing to pay a rather substantial fee for unlimited use. The artist will handle payment and usage authorization on a dial-up line to his data processor.

The artist uses some image creation application, such as Adobe's Photoshop to create his image. The artist then saves the image to file in an appropriate format for distribution, such as the Graphical Interchange Format (GIF). The artist then starts his data packaging program and enters an object identifier, a title, a format code and a security code, which in this example are "123456789", "image", "a", and "b", respectively. In this example, the format code "a" indicates that no format code need be applied, and this code is selected since the GIF format is appropriate and already compressed. Furthermore, the security code "b" indicates that no security module need be applied and this code is selected since the security achieved by the encryption performed by means of the encryption module 305 is considered appropriate by the artist.

Then the artist enters his dial-up phone number, his price for a single use of the image and for unlimited use of the data object, a code for usage types approved, and for number of usages approved. For this purpose, the user interface module 302 may display a data entry form.

The data packaging program 19 creates control data on the basis of the information entered by the artist and stores the data in the header file and in the usage data file as shown in FIGS. 5 and 6, respectively. This data constitutes a general set of control data which is not specifically adapted to a single user, but which indicates the conditions of usage determined by the artist for all future users.

Figure 4:
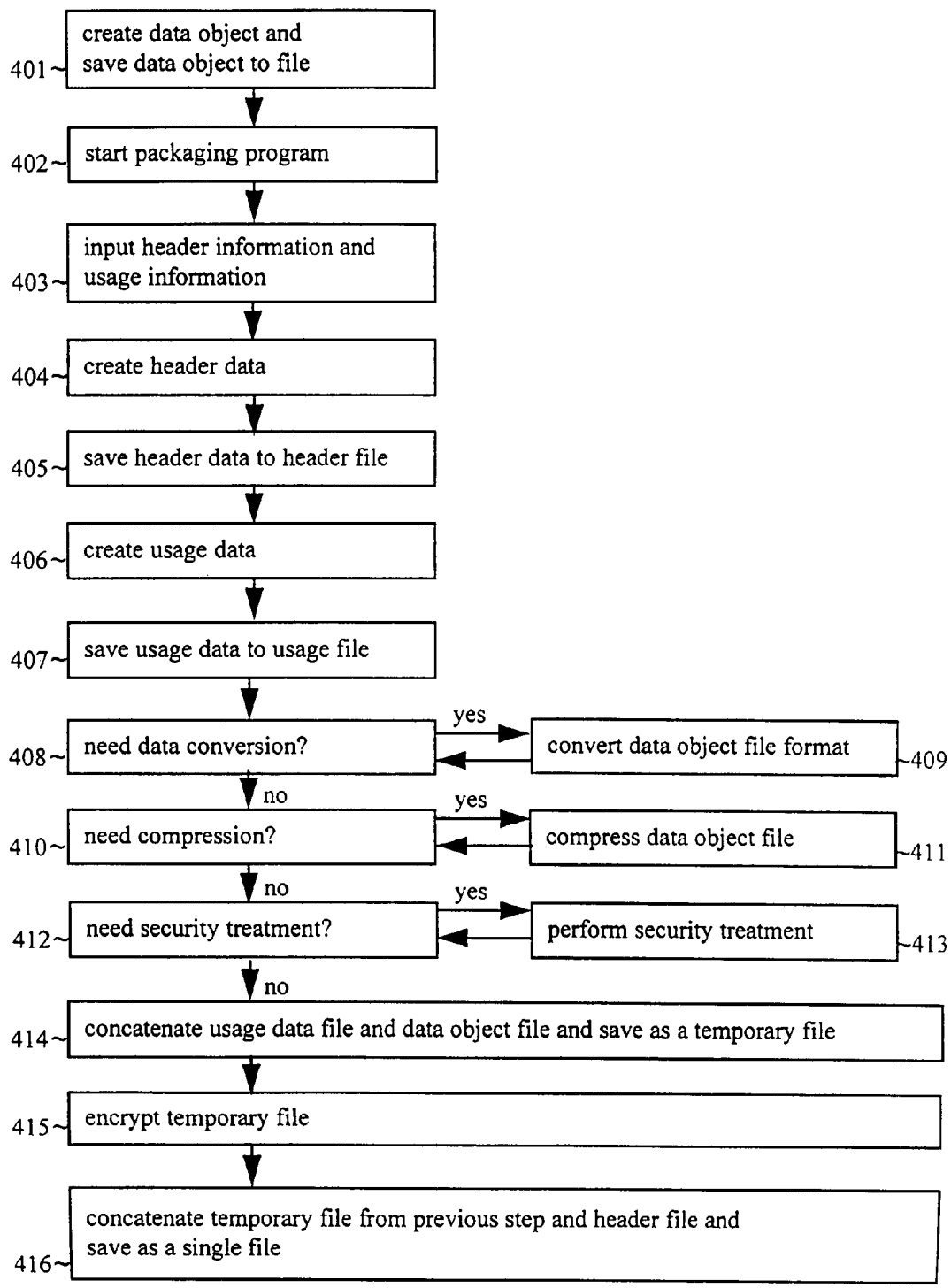
FIG. 4 is a data flow diagram of a data packaging process.
Figure 7:
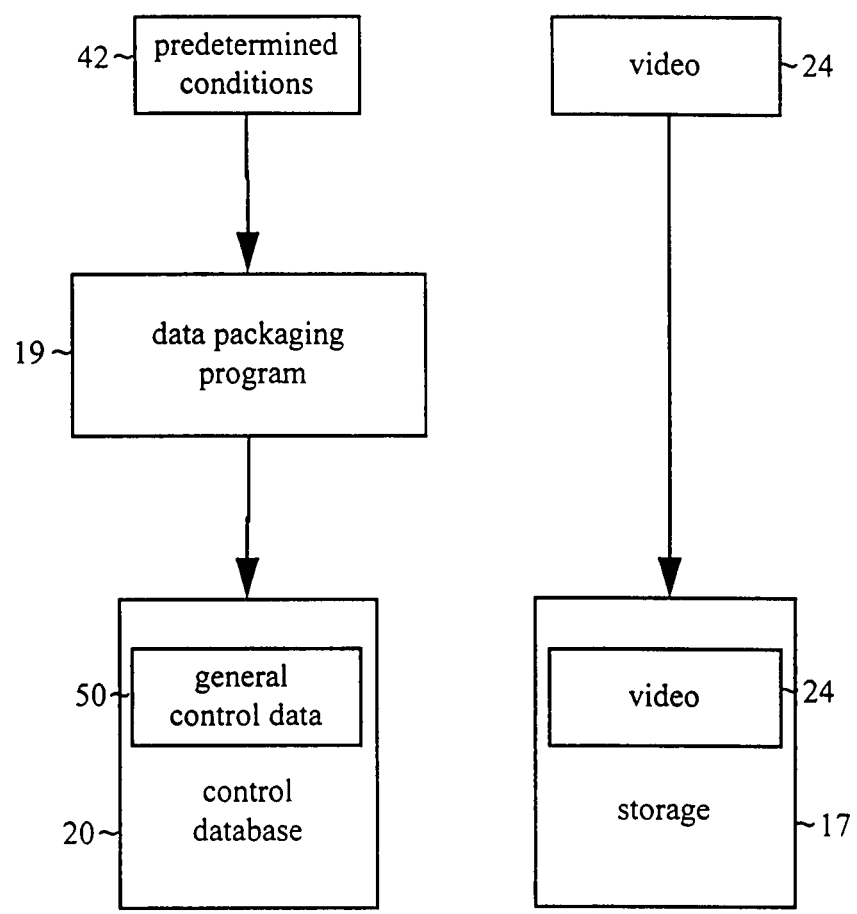
FIG. 7 is a data flow diagram of loading an object to the data object provider's data processor.

Then the package program 19 concatenates the data object and the control data in accordance with steps 414-416 of FIG. 4 to achieve the secure package. No format module or security module is applied to the data object, since they are not needed according to the data in the header file.

When the secure package has been obtained, the artist sends it to a bulletin board, from where it can be retrieved by a user.

EXAMPLE 2

Below, another embodiment of the data packaging program 19 will be described with reference to FIGS. 7-12b. In this example, the data object consists of a video film, which is created by a film company and sent to a broker together with the predetermined conditions 42 for usage of the video. The broker loads the video 24 to the bulk storage 17 of his data processor. Then, he uses his data packaging program 19 to create a general set of control data 50 based on the predetermined conditions 42 for usage indicated by the film company. Furthermore, the address to the video in the bulk storage 17 is stored in an address table in the control database 20 or somewhere else in the memory 11. It could also be stored in the general set of control data 50. Finally, the general set of control data 50 is stored in the control database 20. It could also be stored somewhere else in the memory 11. After these operations, which correspond to steps 401-407 of FIG. 4, the data packaging program is exited.

FIG. 8*a* shows the general set of control data for the video according to this example. Here the control data includes an identifier, a format code, a security code, the number of usage elements, the size of the data object, the size of the usage elements and two usage elements, each comprising an identifier field, a size field and a data field. The identifier may be a unique number in a series registered for the particular broker. In this example, the identifier is "123456789", the format code "0010", which, in this example, indicates the format of a AVI video and the security code is "0010". Furthermore, the first usage element defines the acceptable users for the video and the second usage element data defines the number of viewings of the video purchased by a user. The first usage element data is 1 which, for the purposes of this example will signify that only education oriented users are acceptable to the film company. The data field of the second usage element data is empty, since at this stage no viewings of the video has been purchased.

Managing Object Transfer

The broker wants to transfer data objects to users and enable controlled usage in return for payment of usage fees or royalties. Managing the broker-user business relationship and negotiating the transaction between the broker and the user can both be automated, and the control data structure can provide unlimited support to these operations. The payment can be handled by transmitting credit card information, or the user can have a debit or credit account with the broker which is password activated. Preferably, payment should be confirmed before the data object is transferred to the user.

Data Packaging

When a user wants to use a data object, he contacts the broker and requests authorization for usage of the data object. When the request for authorization is received in the broker's data processor, a data program compares the usage for which authorization is requested with the usage control elements of the control data of the data object to see if it complies with the predetermined conditions for usage indicated therein. The comparison may include comparing the user type, the usage type, the number of usages, the price etc. If the requested usage complies with the predetermined conditions the authorization is granted, otherwise it is rejected.

Figure 9:
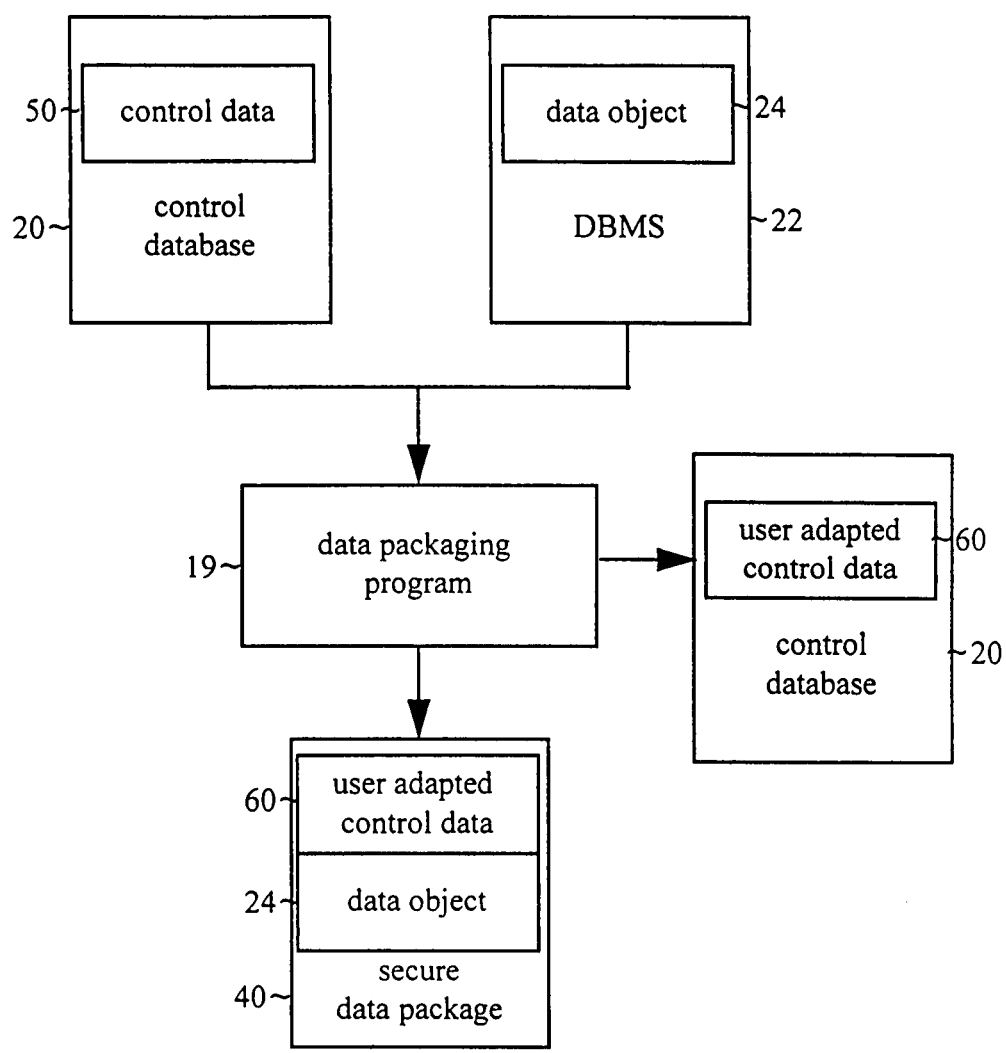
FIG. 9 is a data flow diagram of data packaging on the data object provider's data processor.

FIG. 9 is a data flow diagram of the data packaging on the broker's data processor, which occurs in response to a granted request from a user for authorization for usage of the video, e.g. a granted request for the purchase of two viewings.

In response to a granted request, the broker again applies the data packaging program 19. The general set of control data 50 and the data object 24 are input to the program from the control database 20 and the bulk storage 17, respectively. The program creates a user set of control data 60 on the basis of the general set of control data 50 and concatenates the user set 60 and the data object 24 to create a secure data package 40, which may then be transferred to the user by any suitable means. A copy of the user set of control data is preferably stored in the broker's control database. This gives the broker a record with which to compare subsequent use, e.g. when a dial-up is required for usage.

Figure 10:
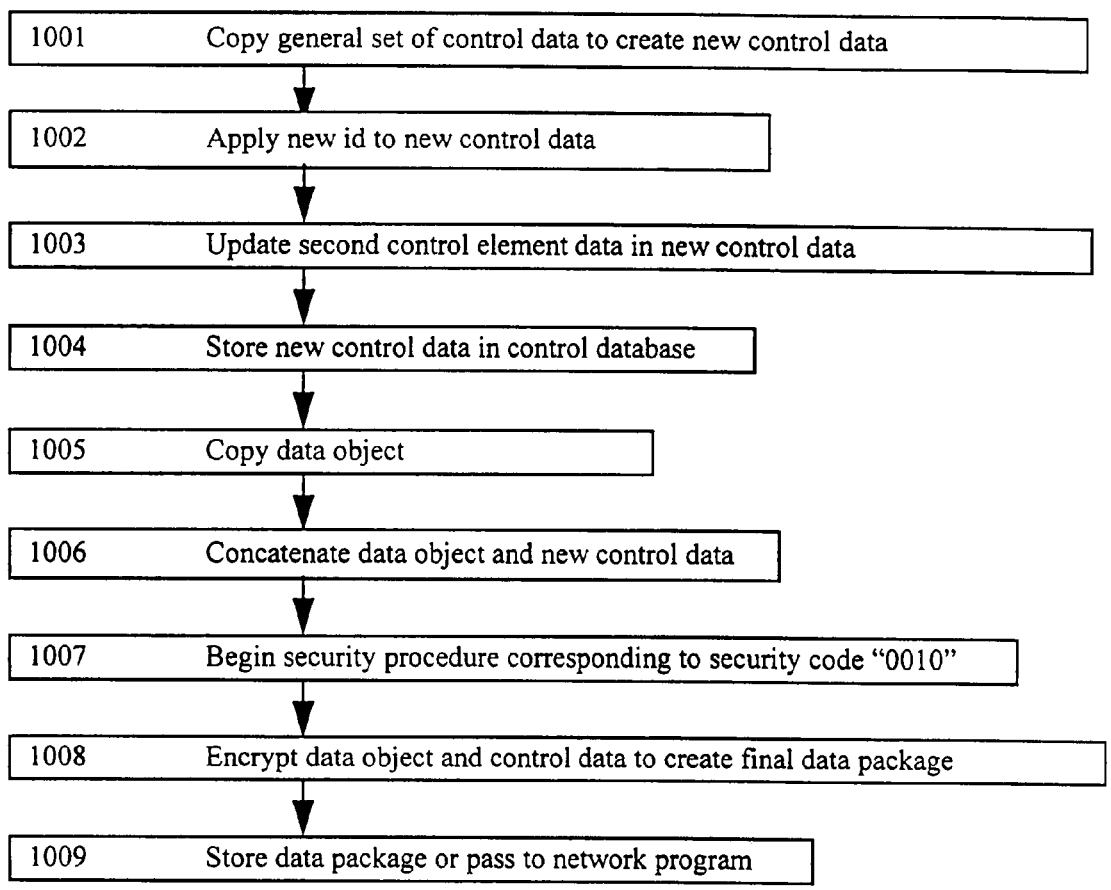
FIG. 10 is a flow diagram of a data packaging procedure.

FIG. 10 is a flow diagram of an exemplary procedure used for creating a user set of control data and for packaging the user set of control data and the video into a secure package. Here, the procedure will be described with reference to the general set of control data shown in FIG. 8*a*.

The user set of control data 60, i.e. a set of control data which is adapted to the specific user of this example, is created in steps 1001-1003 of FIG. 11. First, the general set of control data 50 stored in the control database is copied to create new control data, step 1001. Second, a new identifier, here "123456790", which uniquely identifies the user set of control data, is stored in the identifier field of the new control data 60, step 1002. Third, the data field of the second usage element is updated with the usage purchased, i.e. in this example with two, since two viewings of the video were purchased, step 1003.

The thus-created user set of control data, which corresponds to the general set of control data of FIG. 8*a* is shown in FIG. 8*b*.

The user set of control data is stored in the control database 20, step 1004. Then, the video, which is stored in the bulk storage 17, is copied, step 1005. The copy of the video is concatenated with the user set of control data, step 1006. The security code 0010 specifies that the entire data package 40 is to be encrypted and that the user program 35 must contain a key which can be applied. Accordingly, the whole data package is encrypted, step 1007. Finally, the encrypted data package is stored on a storage media or passed to a network program, step 1008, for further transfer to the user.

FIG. 11 is a memory image of the video 24 and the user control data 60. The user control data and a copy of the video 24 are concatenated as shown in FIG. 12*a*. The encrypted data package 40 is shown in FIG. 12*b*.

The procedure of FIG. 10 can be implemented by the data packaging program of FIG. 3. As an alternative to the procedure of FIG. 10, the user set of control data can be created as in steps 1001-1003 and saved in a header file and in a usage data file, whereafter steps 408-416 of the data packaging program of FIG. 4 can be performed to create the secure package.

The above-described process for creating a user-adapted set of control data may also be used by a user who wants to redistribute a data object or by a broker who wants to distribute the data object to other brokers. Obviously, redistribution of the data object requires that redistribution is a usage approved of in the control data of the data object. If so, the user or the broker creates a user set of control data by adding new control elements and possibly changing the data fields of old control element to reflect the relation between the author and the current user/broker and between the current user/broker and the future user/broker. In this way, an audit trail is created.

The User's Data Processor

Figure 13:
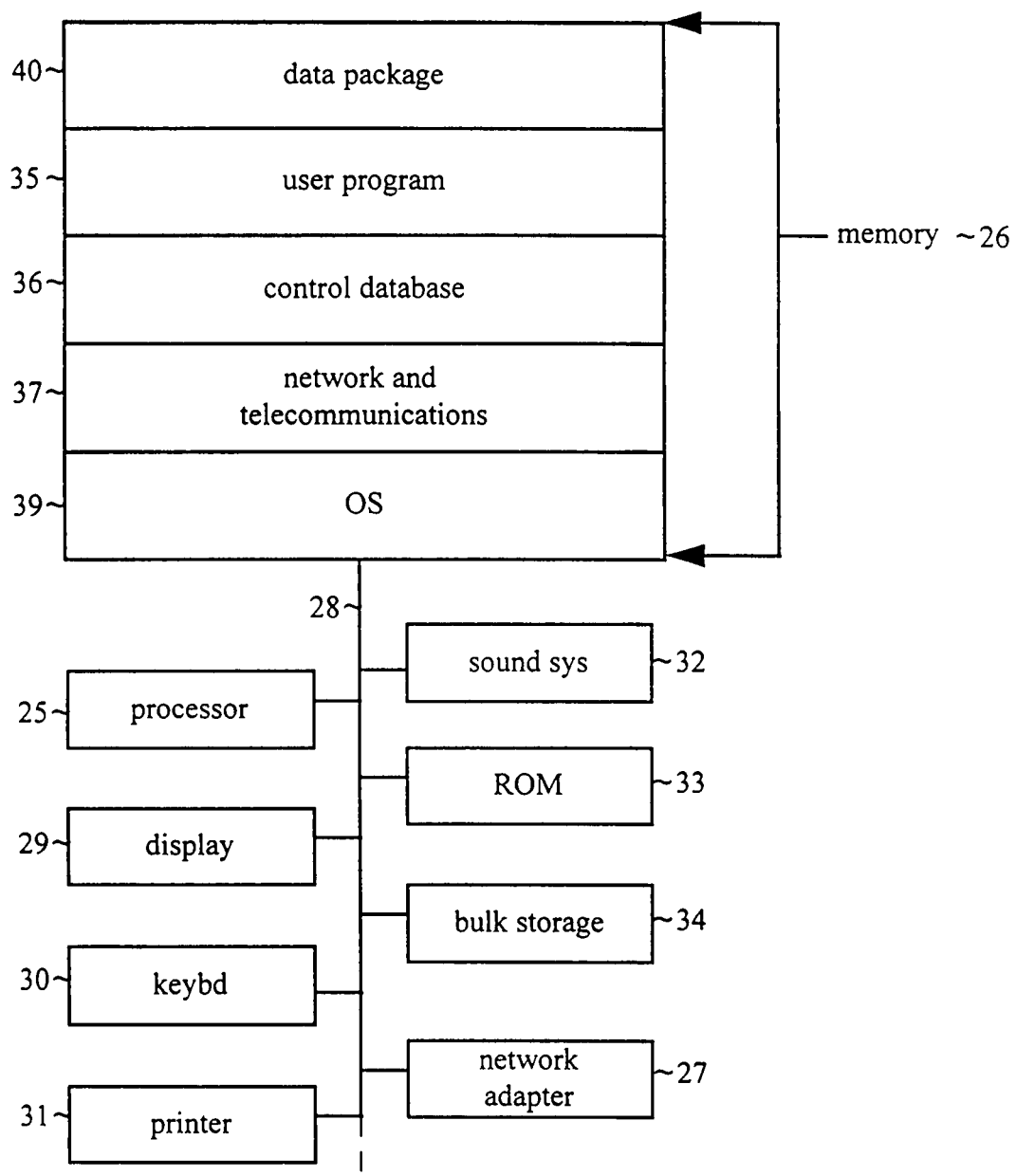
FIG. 13 is a system block diagram of a user's data processor.

The user's data processor, which is shown in FIG. 13, is a general or special purpose processor, preferably with network capabilities. It comprises a CPU 25, a memory 26, and a network adapter 27, which are interconnected by a bus 28. As shown in FIG. 13, other conventional means, such as a display 29, a keyboard 30, a printer 31, a sound system 32, a ROM 33, and a bulk storage device 34, may also be connected to the bus 28. The memory 26 stores network and telecommunications programs 37 and an operating system (OS) 39. All the above-mentioned elements are well-known to the skilled person and commercially available. For the purpose of the present invention, the memory 26 also stores a user program 35 and, preferably, a database 36 intended for the control data. Depending upon the current operation, a data package 40 can be stored in the memory 26, as shown, or in the bulk storage 34.

The User Program

The user program 35 controls the usage of a data object in accordance with the control data, which is included in the data package together with the data object.

Figure 14:
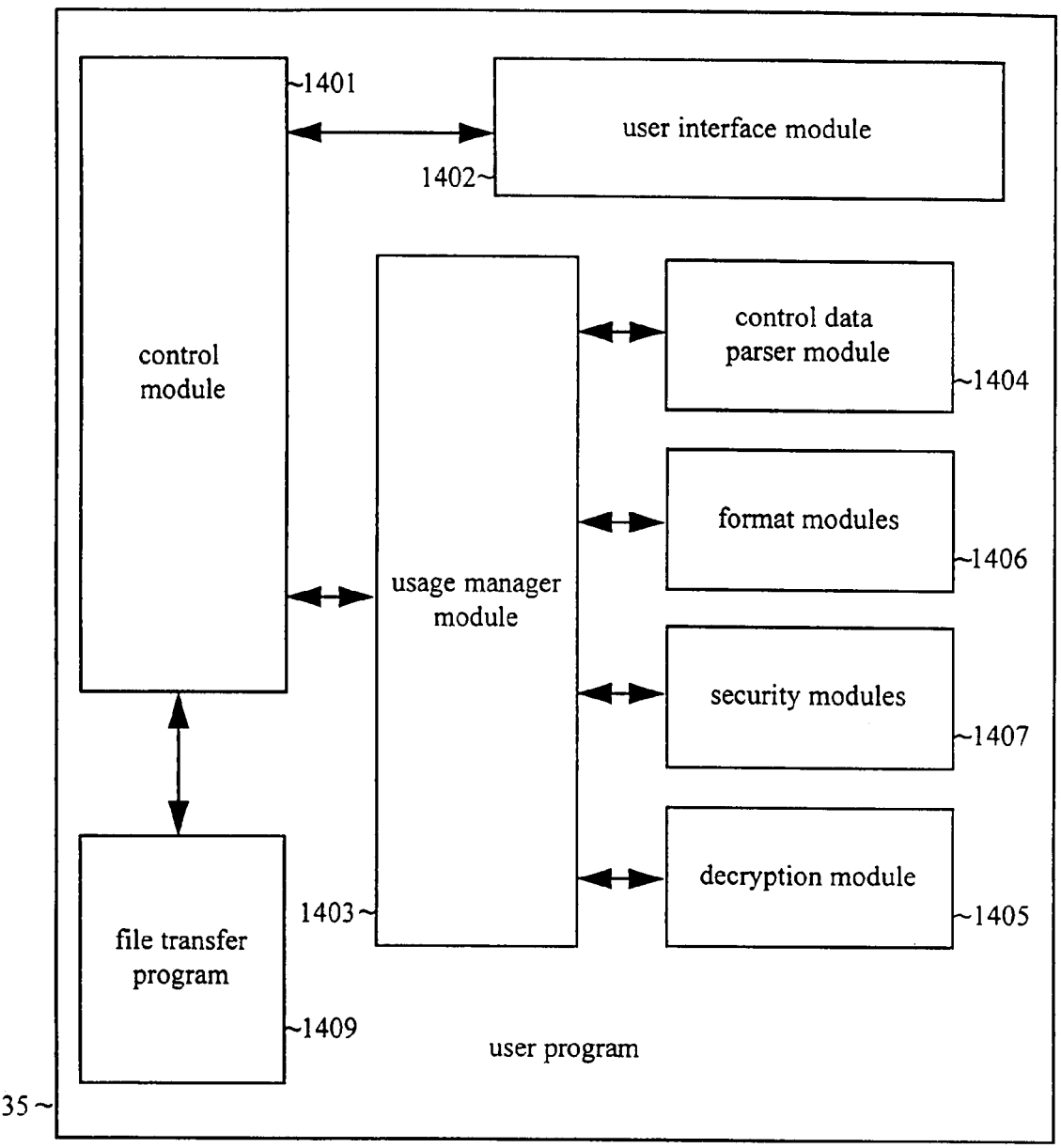
FIG. 14 is a block diagram showing the different modules of a user program according to the invention.

As shown in FIG. 14, the user program 35 comprises a program control module 1401 a user interface module 1402, a usage manager module 1403, a control data parser module 1404, a decryption module 1405, one or more format modules 1406, one or more security modules 1407, and a file transfer program 1409.

The control module 1401 controls the execution of the other modules. The user interface module 1402 handles interactions with the user. The usage manager module 1403 unpackages the secure package 40. It uses the control data parser module 1404, the decryption module 1405, the format modules 1406, and the security modules 1407.

The format modules 1406 comprise program code, which is necessary to handle the data objects in their native format, such as decompression and data format procedures. The security modules 1407 comprises program code required to implement security above the lowest level, such as access control, usage control and more sophisticated decryption than what is provided by the basic decryption module 1405.

The user program 35 can contain many different types of both format and security modules. However, they should be complementary with the format and security modules used in the corresponding data packaging program. The usage manager module 1401 applies the format and security modules which are necessary to use a data object and which are specified in its control data. If the proper format and security modules are not available for a particular data object, the usage manager module 1401 will not permit any usage.

The decryption module 1405 can be the above-mentioned FileCrypt Visual Basic subprogram or some other commercially available decryption program. It can also be a custom designed decryption module. The only restriction is that the decryption module used in the user program is complementary with the encryption module of the data packaging program.

The control data parser module 1403 performs the reverse process of the control data creation module 304 in FIG. 3.

The user program 35 can have code which controls use of the program by password or by any other suitable method. A password may be added in a password control element during packaging of the data object. The password is transferred to the user by registered mail or in any other appropriate way. In response to the presence of the password control element in the control data structure, the user program prompts the user to input the password. The input password is compared with the password in the control data, and if they match, the user program continues, otherwise it is disabled.

The user program 35 can also have procedures which alter the behavior of the program (e.g. provide filters for children) according to the control data of the user object 41. It is important to mention that the user program 35 never stores the object in native format in user accessible storage and that during display of the data object the print screen key is trapped.

The file transfer program 1409 can transfer and receive files via network to and from other data processor.

Since the data object is repackaged into the secure package after the usage, the user program should also include program code for repackaging the data object. The program code could be the same as that used in the corresponding data packaging program 19. It could also be a separate program which is called from the user program.

Operation of the User Program

Figure 15:
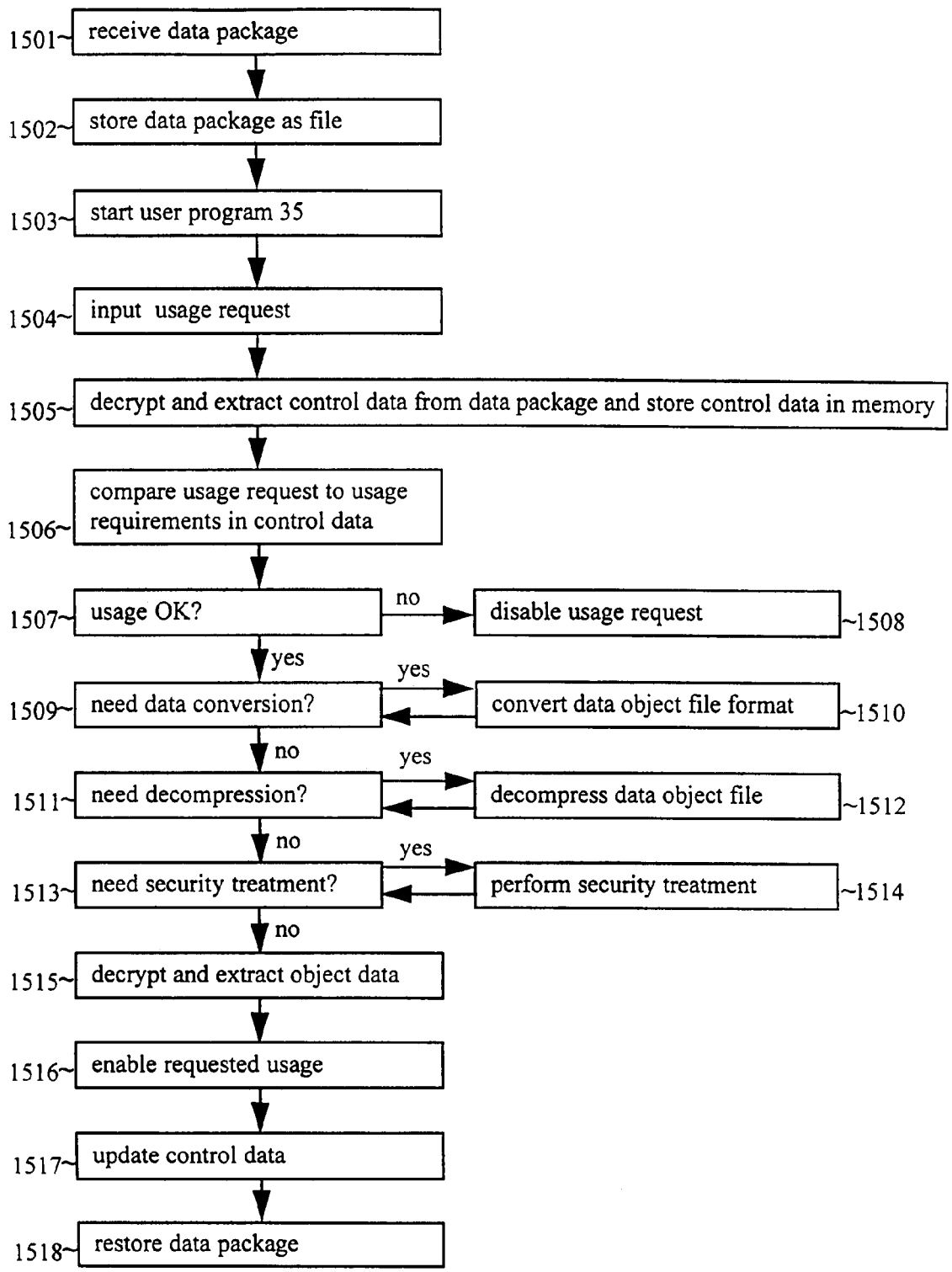
FIG. 15 is a flow diagram of using a data object on the user's data processor.

The operation of an embodiment of the user program 35 will now be described with reference to the block diagram of FIG. 14 and the flow diagram of FIG. 15.

First the user receives a data package 40 via file transfer over a network, or on a storage media such as CD-ROM or diskette, or by any other appropriate means, step 1501. He then stores the data package as a file on his data processor, step 1502.

When the user wants to use the data object, he starts the user program 35, step 1503. Then he requests usage of the data object, step 1504. The request is received by the user interface module 1402, which notifies the control module 1401 of the usage request. The control module 1401 calls the usage manager module 1403 and passes the usage request.

The usage manager module 1403 reads the format code from the data package to determine the control data format. Then it calls the decryption module 1405 to decrypt and extract the control data from the data package. The usage manager module 1403 applies the decryption module 1405 incrementally to decrypt only the control data. Finally, it stores the control data in memory, step 1505.

The usage manager module 1403 then calls the control data parser module 1404 to extract the data fields from the usage elements.

The usage manager module 1403 then compares the user request for usage with the corresponding control data, steps 1506-1507. If the requested usage is not permitted in the control data, the requested usage is disabled, step 1508. However, if the requested usage is approved of in the control data, the usage manager module 1403 applies any format and security modules 1406, 1407 specified in the header data or usage data, steps 1509-1514, to the data package.

Then the usage manager module 1403 calls the decryption module 1405, which decrypts the object data, step 1515, whereafter the requested usage is enabled, step 1516. In connection with the enabling of the usage, the control data may need to be updated, step 1517. The control data may for instance comprise a data field indicating a limited number of usages. If so, this data field is decremented by one in response to the enabling of the usage. When the user has finished usage of the data object, the user program 35 restores the data package in the secure form by repackaging it, step 1518. More particularly, the data object and the usage elements are reconcatenated and reencrypted. Then the header elements are added and the thus-created package is stored in the user's data processor.

EXAMPLE 1

Continued

A specific example of how the user program operates will now be described with reference to FIGS. 6 and 15. The example is a continuation of Example 1 above, where an artist created an image and sent it to a bulletin board.

Assume that a user has found the image at an electronic bulletin board (BBS) and is interested in using it. He then loads the data package 40 containing the image to his data processor and stores it as a file in the bulk storage. The user then executes the user program 35 and requests to preview the image. The user program then performs steps 1505-1507 of the flow diagram in FIG. 15. The request for a preview of the image is compared with the data field of the usage element "code for usage type approved". In this example, the code "9" designates that previews are permitted. Thus, the requested preview is OK. Then, the user program 35 performs step 1509-1515 of FIG. 15. Since the format code "a" and the security code "b" of the header data indicate that neither conversion, nor decompression, nor security treatment is required, the user program only decrypts the object data. The usage manager module 1403 then displays the preview on the user's data processor and passes control back to the user interface 1402.

When the user is finished previewing the image, the user interface module 1402 displays the costs for usage of the image in accordance with the price usage data of the control data ("price for single use" and "price for unlimited use" in FIG. 6) and prompts the user to enter a purchase request. The user decides to buy unlimited use of the image, and the user interface module 1402 inputs purchase information, such as an identification, billing, and address for that request and passes the request to the control module 1401. The control module calls the file transfer program 1409, which dials the artist's dial-up number as indicated in the usage data ("control element for artist's phone number" in FIG. 6) and transfers the request and purchase information to a broker program on the artist's data processor. Upon approval of the purchase, the broker program returns a file containing an update for "usage type approved" control elements. The update is "10" for the usage type approved, which in this example indicates that unlimited use by that user is permitted. The file transfer program 1409 passes this update to the usage manager module 1403 which updates the control data with the "usage type approved" code. The user interface module 1402 then displays a confirmation message to the user.

Subsequently, the user interlace module inputs a request to copy the image to a file packaged according to this invention, on the user's machine. The usage manager module then compares the user request control data. The usage manager module examines the data filed for "Usage type approved", which now is "00". The usage manager module copies the image to the file.

When the user is finished with the image, the usage manager module 1403 repackages the image as before except with updated control data. This repackaging process is exactly like that shown in FIG. 4, except that the header and usage data already exist, so the process starts after step 406 where control data is created.

Improved Security

If the data object provider wants to improve the security of a data package containing a data object, a security module 307 containing a sophisticated encryption algorithm, such as RSA, could be used. In that case the packaging module 303 calls the security module 307 in step 412 of the flow diagram of FIG. 4. The security module encrypts the image and passes a security algorithm code to the control data creation module 302, which adds a control element for the security module code, which will be detected by the user program 35. Then the data packaging continues with step 414. When the data package is sent to the user, the public key is mailed to the user by registered mail. When the user program is executed in response to a request for usage of this data object, the usage manager module will detect the security module code in the control data and call the security module. This module passes control to the user interface module 1402, which requests the user to input the public key. If the key is correct, the user security module applies complementary decryption using that key and passes a usage approved message to the usage manager module, which enables the usage.

As another example of improved security, a security module may implement an authorization process, according to which each usage of the data object requires a dial-up to the data processor of the data object provider. When the corresponding security module code is detected by the user program 35, the relevant security module is called. This module passes a request for authorization to the control module 1401, which calls the file transfer program 1409, which dial the data object provider's dial-up number, which is indicated in a usage element and transfers the request for authorization of usage. Upon a granted authorization, the data provider's data processor returns a usage approved message to the user security module, which forwards the approval to the usage control module, which enables one usage. If the user requests further usages of the data object, the authorization process is repeated. This procedures results in a permanent data object security.

EXAMPLE 2

Continued

Figure 16:
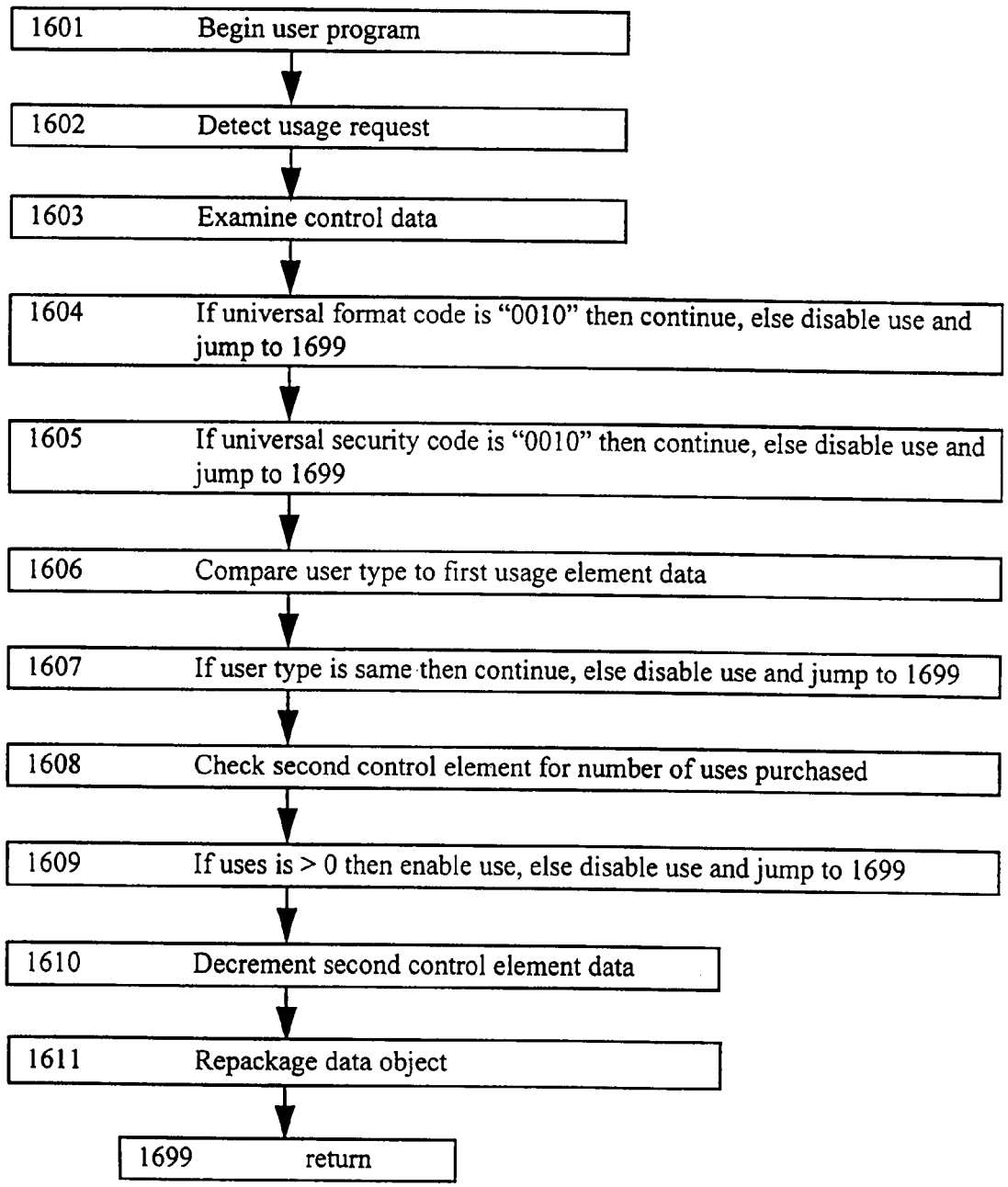
FIG. 16 is a flow diagram of how the user program operates in a specific application example.

A further specific example of how the user program 35 operates will now be described with reference to FIG. 16. The example is a continuation of Example 2 above, where a user purchased two viewings of a video film from a broker.

The user wants to play the video which was purchased and transferred from the broker. The user applies the user program 35, step 1601, and requests to play the video, step 1602. The user program 35 first examines the user set of control data 60, step 1603. In this example, the user program 35 contains only those format and security modules for objects with format code of 0010 and with a security code of 0010. Consequently, only those types of data objects may be used. If the program encounters other codes it will not enable the usage action, step 1604-1605.

Next, the user program 35 compares the first control element data which is 1, for educational users only, to user information entered by the user on request of the user program. Since the user type entered by the user is the same as that indicated in the first usage element the process continues, steps 1606-1607. Then the user program checks the second control element data which specifies that the number of plays purchased is 2. Consequently, the usage is enabled, step 1609. The user program applies the decryption module with the universal key and the AVI format video is displayed on the display unit 29. Then, the second control element data is decremented by one, step 1610. Finally, the video is repackaged, step 1611. Proceeding to a step 1699, the user program returns to its initial state to process further requests from the user.

Implementation of Variable and Extensible Object Controls

Object control is achieved through the interaction of the data packaging program 19 and the usage program 35 with the control data. Variation of object control can be applied to a particular object by creating a control data format with control elements defining the control variation and the circumstances in which the variation is applied. Program procedures should then be added to program modules to process the control elements. For example, suppose a broker wants to allow students to print a particular article for free but require business users to pay for it. He defines control elements to represent the user types student and business and the associated costs for each. He then adds program logic to examine the user type and calculate costs accordingly. Object control is extensible in the sense that the control data format can have as many elements as there are parameters defining the rules for object control.

Implementation of Variable and Extensible Object Security

Object security is also achieved through the interaction of the data packaging program 19 and the user program 35 with the control data. Security process and encryption/decryption algorithms can be added as program modules. Variation of object security can be applied to a particular object by creating a control data format with control elements defining the security variation and the circumstances in which the variation is applied. Program procedures should be added to program modules to process the control elements. For example, suppose a broker wants to apply minimal security to his collection of current news articles but to apply tight security to his encyclopedia and text books. He defines a control element for security type. He then adds program logic to apply the security algorithms accordingly. Object security is extensible in the sense that multiple levels of security can be applied. The level of security will of course be dependent on the encryption/key method which is implemented in the security modules. One level of security may be to require on-line confirmation when loading a data object to the user's data processor. This can be implemented in program code in a security module. This permits the broker to check that the object has not already been loaded as well as double check all other parameters.

It is also important to have version control with time stamping between the usage program and the user's control database. Otherwise the database can be duplicated and reapplied to the user program. The user program can place a time stamp in the control database and in a hidden system file each time the control database is accessed. If the time stamps are not identical, the control database has been tampered with and all usage is disabled. Program code for handling time stamps can reside in a security module.

Handling-Composite Objects

A composite object can be handled by defining a control data format with control elements defining relationships between constituent objects and by defining a parent/child element and a related object id element. For example, suppose a broker wants to include a video and a text book in an educational package. He creates a parent object with control elements referring to the video and textbook objects. He also includes control elements in the control data for the video object and the textbook object referring to the parent object. Finally, he adds program procedures to program modules to process the control elements.

In other words, when the data object is a composite data object including at least two constituent data objects, a respective general set of control data is created for each of the constituent data object and the composite data object. In response to a request from a user, a respective user set of control data is created for each of the constituent data objects as well as for the composite data object.

Figure 17:
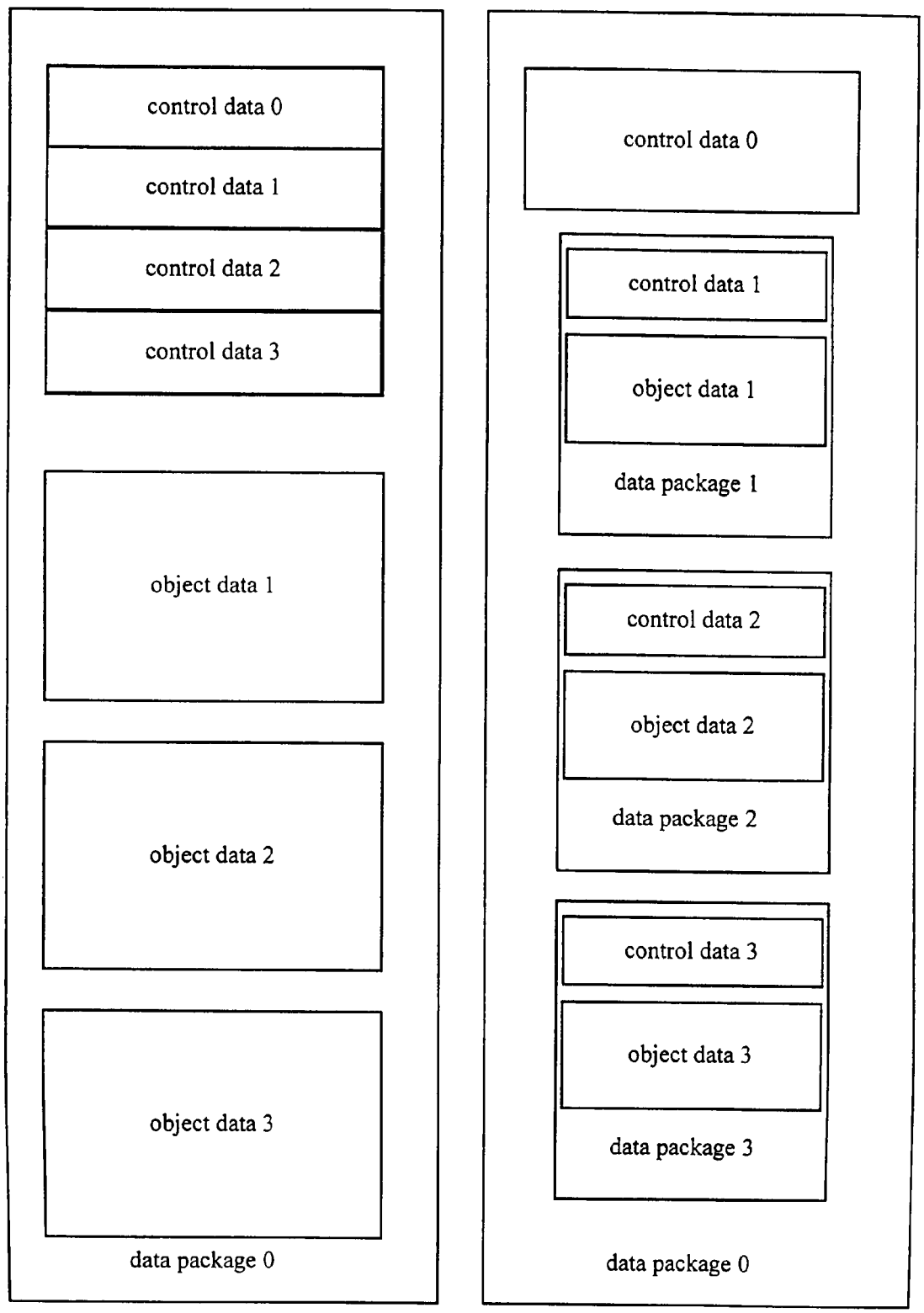
FIG. 17 is an example of various data package structures for composite objects.

Examples of various data package structures for composite objects are given in FIG. 17.

Another side of composite objects is when the user wants to combine data objects for some particular use. Combination is a usage action that must be permitted in each constituent data object. A new data object is created with control data linking the constituent data objects. Each constituent data object retains its original control data which continues to control its subsequent usage.

When a user requests authorization for usage of one constituent data object in a composite data object, a user set of control data is created only for that constituent data object and concatenated only with a copy of that constituent data object.

Scaleable Implementation

The flexible control data structure and modular program structure permit almost boundless extensibility with regard to implementation of the owner's requirements for usage control and royalty payment. The control data structure can include control elements for complex user types, usage types, multiple billing schemes, artistic or ownership credit requirements and others. Security modules can be included which interact with any variation of the control data structure and the control data. Security modules could require a dial up to the brokers data processor to approve loading or usage actions and to implement approval authentication mechanisms.

User Acting As a broker

A limited or full implementation of the broker's data packaging program can be implemented on the user's machine to permit further distribution or reselling. However, only those data objects with control data permitting further distribution or reselling are enabled in that way.

Rebrokering

An author of a data object may want to allow his original broker to distribute his data object to other brokers whom will also distribute his image. He then includes a control element which enables rebrokering in the control data before distributing the data object with its associated control data to the original broker. Upon request for rebrokering, the original broker copies the general set of control data and updates the copy to create a user set of control data which will function as the general set of control data on the subsequent brokers data processor. The original broker packages the data object with the user set of control data and transfers the package to the subsequent broker. The subsequent broker then proceeds as if he were an original broker.

Automated Transaction Negotiation

This is an example of how the predetermined conditions for usage included in the control data can be used for achieving automated transaction negotiation.

Suppose some company wants to provide a computer automated stock trading. Buy and sell orders could be implemented in the form of data packages and a user program could process the data packages and execute transactions. Data packages could carry digital cash and manage payment based on conditions defined in the control data.

In this example, the buy order is created using a data packaging program according to the invention on the buyer's data processor. The sell order is created using the data packaging program on the seller's data processor. Both orders are used by the user program on the stock trader's data processor. The usages would take the form of using a sell order data package to sell stock and a buy order data package to buy stock. The rules or conditions for buying and selling stocks could be indicated in the control data of the packages. The data object consists of digital money. In this context it is important to remember that digital money is merely data which references real money or virtual money that is issued and maintained for the purpose of digital transactions.

In this example the buyer starts with a digital money data file. He uses the data packaging program to create control data, e.g. kind of stock, price, quantity, for the purchase, and he then packages the digital money data file and the control data into a secure package as described above.

The seller starts with an empty data file. This empty file is analogous to the digital money data file except it is empty. The seller creates control data, e.g. kind of stock, price, quantity, and packages the empty file and the control data into a secure package.

Both the sell order package and the buy order package are transferred to the data processor of the stock trading company, where they are received and stored in the memory. The user program of the stock trading company examines the control data of the buy and sell order packages in the same way as has been described above and looks for a match. Upon identifying matched buy and sell orders the user program executes a transaction, whereby the digital money is extracted from the buy order data package and transferred to the sell order package. Then the control data of the data packages is updated to provide an audit trail. Both packages are repackaged in the same manner as they were previously packaged and then transferred back to their authors.

The above described technique could be used for selling and buying any object as well as for automated negotiations. Payment may be carried out in other ways than by digital money.

In the general case, the data processor of the user decrypts the usage control elements of the user sets of control data and examines the usage control elements to find a match. In response to the finding of a match, the user's data processor carries out an action which is specified in the user set of control data.

The invention claimed is:

1. A method of controlling the usage by a user of data objects so as to comply with a variable number of conditions for usage of the data objects, comprising:

providing at least two data packages, each data package comprising a data object and a user set of control data, which comprises at least one usage control element defining a usage of the data object which complies with the variable number of conditions, the data object and the user set of control data for each data package being encrypted;

decrypting the user set of control data for each data package;

examining the usage control elements of the at least two data packages to find a match;

checking whether a data processor is capable of executing a security procedure specified in a security control element of the at least one usage control element, and disabling the usage when the data processor is not capable of executing the security procedure; and performing an action being specified in the user sets of control data of the at least two data packages.

* * * * *